US012579123B2

(12) United States Patent (10) Patent No.: US 12,579,123 B2
Choo et al. (45) Date of Patent: Mar. 17, 2026

(54) DATABASE INDEX EVALUATION USING PROCESSOR-BASED QUANTILE CLASSIFICATION

(71) Applicant: Dell Products L.P., Round Rock, TX (US)

(72) Inventors: Lead Ta Choo, Puchong (MY); Tai Ee Ooi, Perai (MY); Beng Kiong Cheah, Bukit Mertajam (MY)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/819,372

(22) Filed: Aug. 29, 2024

(65) Prior Publication Data

US 2026/0064651 A1 Mar. 5, 2026

(51) Int. Cl.
*G06F 16/22* (2019.01)
*G06F 11/34* (2006.01)
*G06F 16/2453* (2019.01)

(52) U.S. Cl.
CPC ...... *G06F 16/2264* (2019.01); *G06F 11/3409* (2013.01); *G06F 16/2453* (2019.01)

(58) Field of Classification Search
CPC ................................................ G06F 16/2264
USPC ........................................................ 707/741
See application file for complete search history.

(56) References Cited

U.S. PATENT DOCUMENTS

| | | | | |
|---|---|---|---|---|
| 8,463,824 B2 * | 6/2013 | Sifry | .................... | G06F 16/958 |
| | | | | 707/726 |
| 9,773,032 B2 * | 9/2017 | Perry | .................... | G06F 16/217 |
| 12,117,823 B1 * | 10/2024 | Spirko | ................ | G06F 16/2228 |
| 2008/0281764 A1 * | 11/2008 | Baxter | ................. | G06F 18/214 |
| | | | | 706/12 |
| 2013/0103713 A1 * | 4/2013 | Woodruff | .......... | G06F 16/24554 |
| | | | | 707/769 |
| 2021/0303539 A1 * | 9/2021 | Zait | ...................... | G06F 16/217 |

OTHER PUBLICATIONS

Lin, Pohan; "8 Indexing Strategies to Optimize Database Performance"; Database Optimization; Apr. 4, 2024.
(Continued)

*Primary Examiner* — Muluemebet Gurmu
(74) *Attorney, Agent, or Firm* — Ryan, Mason & Lewis, LLP

(57) ABSTRACT

Techniques are provided for database index evaluation using processor-based quantile classification. One method comprises obtaining information characterizing one or more database indexes associated with a given database; obtaining performance data for one or more queries, wherein the performance data for a given query may comprise: (i) a number of executions of the given query, (ii) a number of occurrences of the given query satisfying resource utilization criteria and/or (iii) an estimated execution time savings for the given query using at least one of the database indexes; assigning a priority to at least one database index based on a quantile classification of the performance data; and initiating an automated action based on the assigned priority of the least one database index. An execution time of a given query before a given database index is implemented can be compared with a corresponding execution time after the given database index is implemented.

20 Claims, 11 Drawing Sheets

(56)          References Cited

OTHER PUBLICATIONS

"6 Crucial Indexing Best Practices and Priorities in SQL Server that
You Must Keep in Mind"; Mar. 5, 2019.
Sinha, Hemang; "Indexing in Databases: Unlocking the Power of
Data Retrieval"; Oct. 7, 2023.

\* cited by examiner

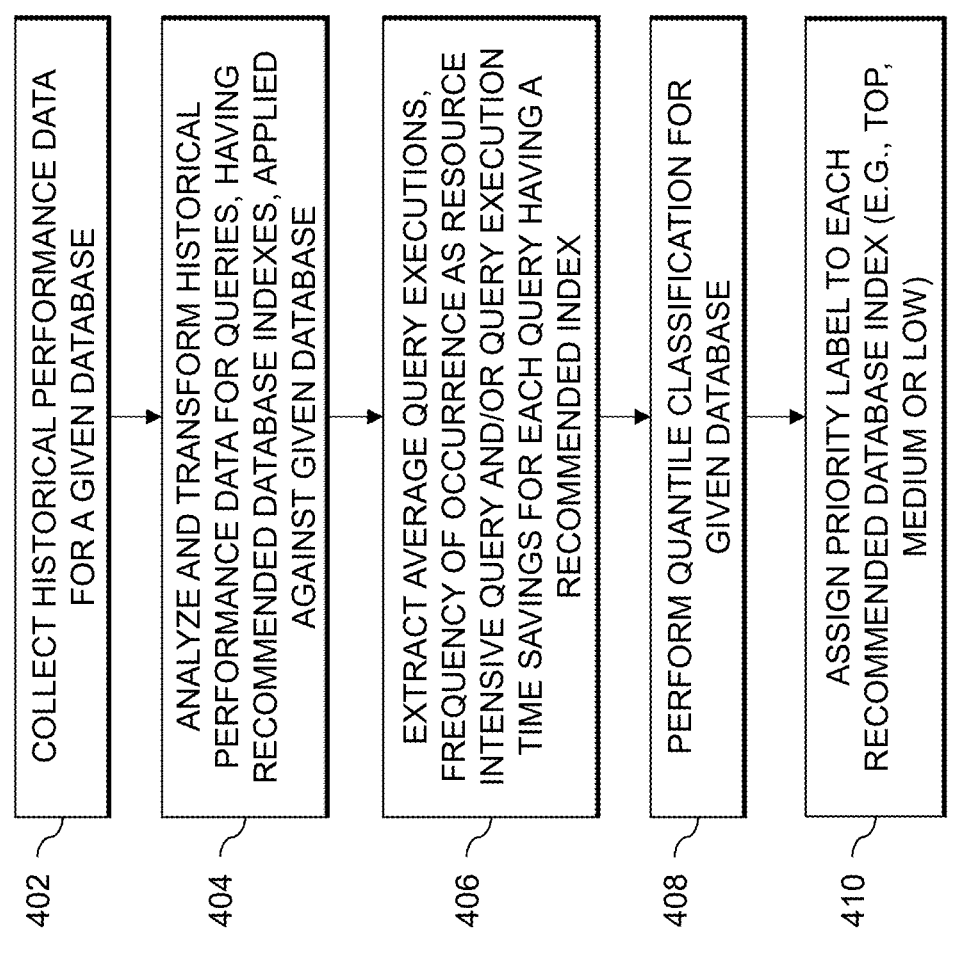

COLLECT HISTORICAL PERFORMANCE DATA FOR A GIVEN DATABASE

402

ANALYZE AND TRANSFORM HISTORICAL PERFORMANCE DATA FOR QUERIES, HAVING RECOMMENDED DATABASE INDEXES, APPLIED AGAINST GIVEN DATABASE

404

EXTRACT AVERAGE QUERY EXECUTIONS, FREQUENCY OF OCCURRENCE AS RESOURCE INTENSIVE QUERY AND/OR QUERY EXECUTION TIME SAVINGS FOR EACH QUERY HAVING A RECOMMENDED INDEX

406

PERFORM QUANTILE CLASSIFICATION FOR GIVEN DATABASE

408

ASSIGN PRIORITY LABEL TO EACH RECOMMENDED DATABASE INDEX (E.G., TOP, MEDIUM OR LOW)

DATABASE INDEX RECOMMENDATION
TABLE 500

| QUERY ID | QUERY | RECOMMENDED DATABASE INDEX | BENEFIT (%) |
|---|---|---|---|
| 1 | SELECT * FROM customers WHERE city > 'NEW YORK' | CREATE INDEX id customer city ON customers(city) | 80 |
| 2 | SELECT name, email FROM users WHERE age > 18 | CREATE INDEX id_users_age ON users(age) | 99 |
| 3 | SELECT product_name, price FROM products ORDER BY price DESC | CREATE INDEX idx_products_price ON products(price DESC) | 94 |
| 4 | SELECT COUNT(*) FROM orders WHERE status = 'completed | CREATE INDEX id_orders_status ON orders(status) | 90 |
| 5 | SELECT AVG(salary) FROM employees WHERE department = 'Sales' | CREATE INDEX id_employees_department ON employees(department) | 84 |
| 6 | SELECT * FROM orders WHERE order date BETWEEN '2022-01-01' AND '2022-01-31' | CREATE INDEX id_orders_order_date ON orders(order_date) | 96 |
| 7 | SELECT customer_name, SUM(total amount) FROM orders GROUP BY customer_name | CREATE INDEX id_orders_customer_name ON orders (customer_name) | 88 |
| ... | ... | ... | ... |
| N | SELECT product name FROM products WHERE category_id IN (1, 2, 3) | CREATE INDEX idx_products_category_id ON products(category_id) | 91 |

FIG. 5

DATABASE INDEX RECOMMENDATION
PRIORITY TABLE 600

| QUERY ID | RECOMMENDED DATABASE INDEX | BENEFIT (%) | AVERAGE QUERY EXECUTIONS | FREQ. OF RESOURCE INTENSIVE | TIME SAVINGS | PRIORITY LABEL |
|---|---|---|---|---|---|---|
| 1 | CREATE INDEX id customer city ON customers(city) | 80 | 21272 | 29 | 16 | TOP |
| 2 | CREATE INDEX id_users_age ON users(age) | 99 | 302586 | 26 | 5 | TOP |
| 3 | CREATE INDEX idx_products_price ON products(price DESC) | 94 | 57054 | 30 | 14 | TOP |
| 4 | CREATE INDEX id_orders_status ON orders(status) | 90 | 2130 | 10 | 340 | MEDIUM |
| 5 | CREATE INDEX id_employees_dept ON employees(department) | 84 | 164 | 5 | 2440 | MEDIUM |
| 6 | CREATE INDEX id_orders_order_date ON orders(order_date) | 96 | 80 | 2 | 2603 | LOW |
| 7 | CREATE INDEX id_orders_customer_name ON orders (customer_name) | 88 | 183 | 1 | 42 | LOW |
| ... | ... | ... | ... | ... | ... | ... |
| P | CREATE INDEX idx_products category_id ON products(category_id) | 91 | 409 | 2 | 1 | LOW |

FIG. 6

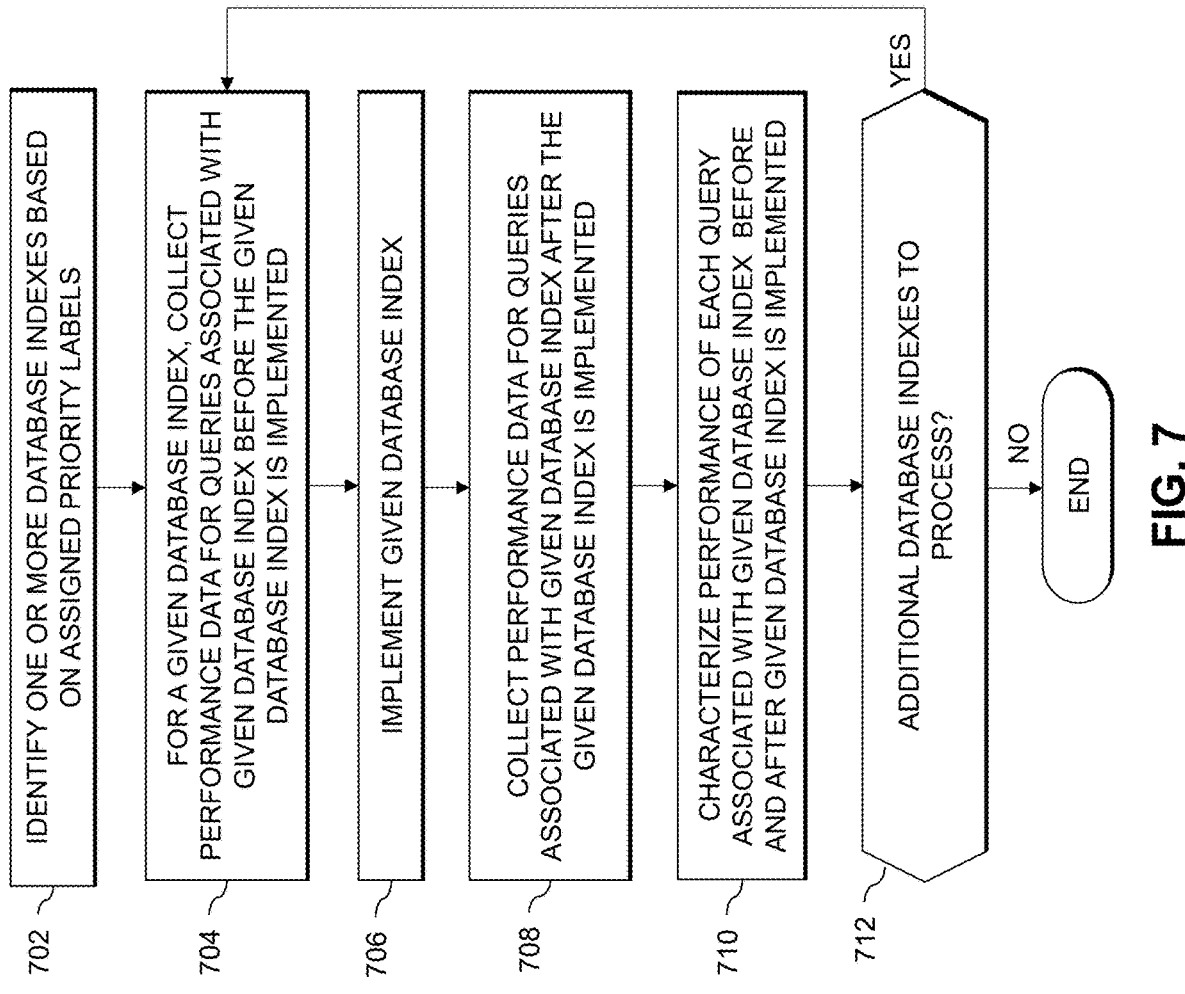

702 — IDENTIFY ONE OR MORE DATABASE INDEXES BASED ON ASSIGNED PRIORITY LABELS

704 — FOR A GIVEN DATABASE INDEX, COLLECT PERFORMANCE DATA FOR QUERIES ASSOCIATED WITH GIVEN DATABASE INDEX BEFORE THE GIVEN DATABASE INDEX IS IMPLEMENTED

706 — IMPLEMENT GIVEN DATABASE INDEX

708 — COLLECT PERFORMANCE DATA FOR QUERIES ASSOCIATED WITH GIVEN DATABASE INDEX AFTER THE GIVEN DATABASE INDEX IS IMPLEMENTED

710 — CHARACTERIZE PERFORMANCE OF EACH QUERY ASSOCIATED WITH GIVEN DATABASE INDEX BEFORE AND AFTER GIVEN DATABASE INDEX IS IMPLEMENTED

712 — ADDITIONAL DATABASE INDEXES TO PROCESS?

YES

NO

END

FIG. 7

INDEX QUERY PERFORMANCE TABLE 800

| QUERY | RECOMMENDED DATABASE INDEX | INDEX CREATION DATE | PRE-INDEX EXECUTION TIME | POST-INDEX EXECUTION TIME | ANALYSIS |
|---|---|---|---|---|---|
| SELECT * FROM customers WHERE city = 'London | idx_customer_city | 19-Jan-2024 | 1 | 0.8 | IMPROVE |
| SELECT customer_name, email FROM customers WHERE age > 18 | idx_customer_city | 19-Jan-2024 | 3 | 2.5 | IMPROVE |
| INSERT INTO customers (customer_name, email, age) VALUES (John Doe', john.doe@example.com', 25) | idx_customer_city | 19-Jan-2024 | 1 | 1.2 | DEGRADE |
| UPDATE customers SET email = 'newemail@example.com WHERE customer_id = 123 | idx_customer_city | 19-Jan-2024 | 1 | 1 | EQUAL |
| SELECT COUNT(*) FROM customers WHERE city = 'New York' | idx_customer_city | 19-Jan-2024 | 2 | 1 | IMPROVE |
| SELECT product_name, price FROM products WHERE category_id = 1 | idx_products_price | 1-Feb-2024 | 3 | 3 | EQUAL |
| SELECT product_name, description FROM products WHERE price > 100 AND rating > 4 | idx_products_price | 1-Feb-2024 | 4 | 2 | IMPROVE |
| ... | ... | ... | ... | ... | ... |
| SELECT COUNT(*) FROM products WHERE price < 500 | idx_products_price | 1-Feb-2024 | 3 | 2 | IMPROVE |

FIG. 8

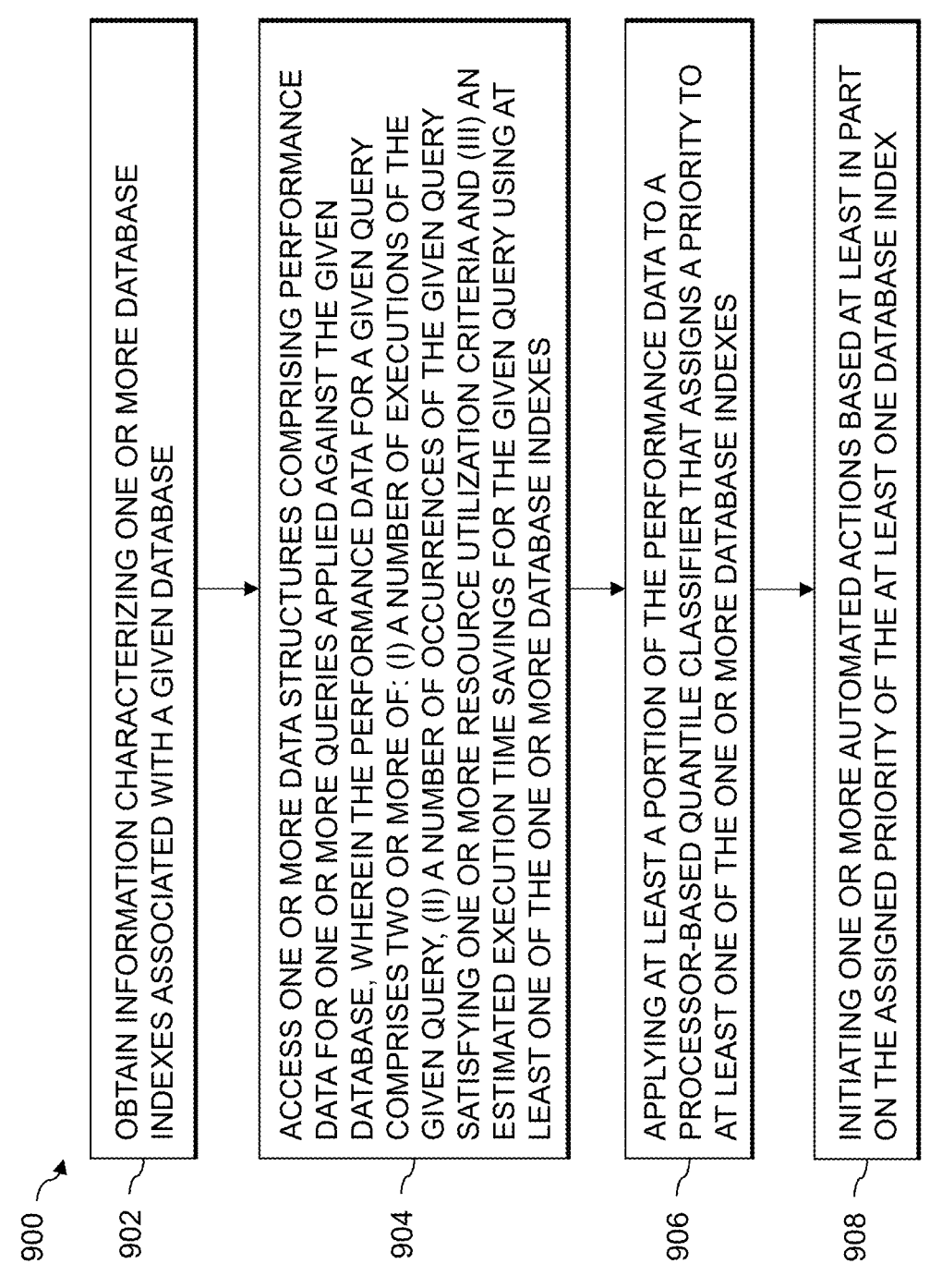

OBTAIN INFORMATION CHARACTERIZING ONE OR MORE DATABASE INDEXES ASSOCIATED WITH A GIVEN DATABASE

902

ACCESS ONE OR MORE DATA STRUCTURES COMPRISING PERFORMANCE DATA FOR ONE OR MORE QUERIES APPLIED AGAINST THE GIVEN DATABASE, WHEREIN THE PERFORMANCE DATA FOR A GIVEN QUERY COMPRISES TWO OR MORE OF: (I) A NUMBER OF EXECUTIONS OF THE GIVEN QUERY, (II) A NUMBER OF OCCURRENCES OF THE GIVEN QUERY SATISFYING ONE OR MORE RESOURCE UTILIZATION CRITERIA AND (III) AN ESTIMATED EXECUTION TIME SAVINGS FOR THE GIVEN QUERY USING AT LEAST ONE OF THE ONE OR MORE DATABASE INDEXES

904

APPLYING AT LEAST A PORTION OF THE PERFORMANCE DATA TO A PROCESSOR-BASED QUANTILE CLASSIFIER THAT ASSIGNS A PRIORITY TO AT LEAST ONE OF THE ONE OR MORE DATABASE INDEXES

906

INITIATING ONE OR MORE AUTOMATED ACTIONS BASED AT LEAST IN PART ON THE ASSIGNED PRIORITY OF THE AT LEAST ONE DATABASE INDEX

DATABASE INDEX EVALUATION USING PROCESSOR-BASED QUANTILE CLASSIFICATION

BACKGROUND

Database indexes aim to improve the performance of data retrieval operations, such as queries, typically by reducing the number of data records to be processed. A given database index acts as a roadmap or a reference point to efficiently locate specific data within a database. Identifying the best database index to improve the performance of a given query, however, is often a challenging task.

SUMMARY

Illustrative embodiments of the disclosure provide techniques for database index evaluation using processor-based quantile classification. One method includes obtaining information characterizing one or more database indexes associated with a given database; accessing one or more data structures comprising performance data for one or more queries applied against the given database, wherein the performance data for a given query comprises two or more of: (i) a number of executions of the given query, (ii) a number of occurrences of the given query satisfying one or more resource utilization criteria and (iii) an estimated execution time savings for the given query using at least one of the one or more database indexes; applying at least a portion of the performance data to a processor-based quantile classifier that assigns a priority to at least one of the one or more database indexes; and initiating one or more automated actions based at least in part on the assigned priority of the at least one database index.

Illustrative embodiments can provide significant advantages relative to conventional techniques. For example, technical problems related to such conventional techniques are mitigated in one or more embodiments by processing historical query performance data using quantile classification techniques to prioritize database indexes.

These and other illustrative embodiments described herein include, without limitation, methods, apparatus, systems, and computer program products comprising processor-readable storage media.

BRIEF DESCRIPTION OF THE DRAWINGS

FIG. 4 is a flow diagram illustrating an exemplary implementation of a process for assigning priority labels to recommended database indexes in accordance with an illustrative embodiment;

FIG. 5 is a sample table illustrating exemplary information maintained for representative recommended database indexes in accordance with an illustrative environment;

FIG. 6 is a sample table illustrating exemplary priority information maintained for representative recommended database indexes in accordance with an illustrative environment;

FIG. 7 is a flow diagram illustrating an exemplary implementation of a process for evaluating query performance before and after a given database index is implemented in accordance with an illustrative embodiment;

FIG. 8 is a sample table illustrating exemplary query performance information maintained for representative queries in accordance with an illustrative environment;

FIG. 9 is a flow diagram illustrating an exemplary implementation of a process for database index evaluation using quantile classification in accordance with an illustrative embodiment;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for database index evaluation using quantile classification.

As noted above, identifying the best database index to improve the performance of a given query is often a challenging task. For example, the advantages of a given database index must be weighed against other tradeoffs, such as processing and memory usage. A database is a structured collection of data that is organized and stored in a way that allows for efficient retrieval, management, and manipulation. A database query is a request or command that is sent to a database management system (DBMS) to retrieve, manipulate and/or modify data stored in a database.

Database administrators, for example, can receive index recommendations from database vendors and/or database tools that suggest database indexes that can help improve query performance. The number of available database index recommendations, however, can often be overwhelming. Thus, it is often difficult to identify the most important database indexes for performance enhancement. For example, database indexes may be created for non-critical queries, which can unnecessarily consume storage resources and thereby impact capacity planning (e.g., leading to an inefficient utilization of resources). Additionally, having too many database indexes on a table can also impact the performance of data manipulation language (DML) operations. The presence of numerous database indexes can, for example, slow down insert, update, and delete operations, as the database needs to maintain and update the database indexes along with the data.

In one or more embodiments, the disclosed techniques for database index evaluation leverage data science techniques, such as quantile-based classification, with query performance parameters to classify one or more database index recommendations. Historical performance data is collected from databases and recommended database indexes are evaluated to estimate the time savings that may be achieved if a given recommended database index is implemented. In this manner, the disclosed techniques for database index evaluation using quantile classification provide a mechanism for filtering and/or categorizing database index recommendations in order to identify the database index recommendations that are most important. The historical performance data may include, for a given query, the number of times the given query is executed. In addition, the top N queries may be identified in different categories (such as a number of query executions, an IO wait time, a resource usage, an elapsed execution time and/or the processor execution time).

Figure 1:
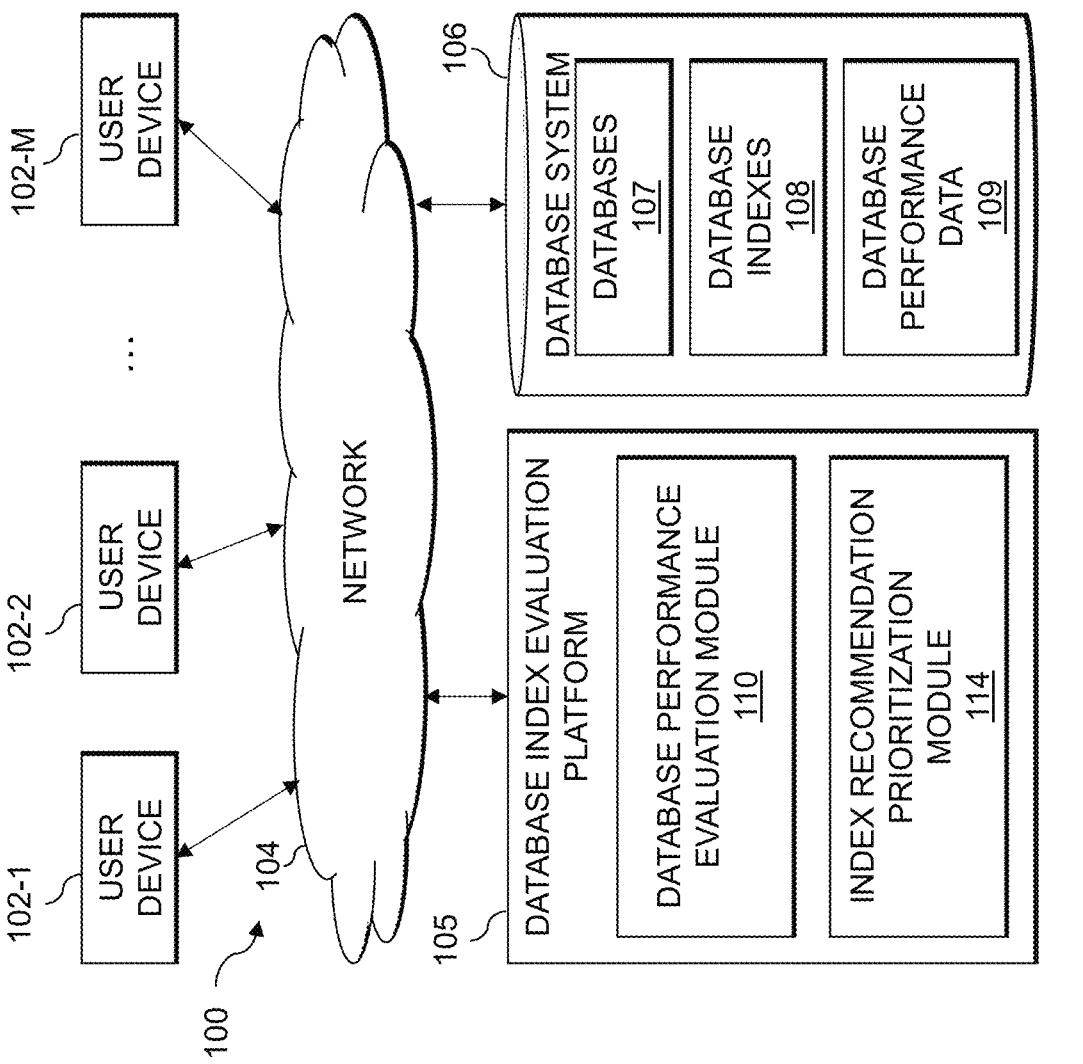
FIG. 1 illustrates an information processing system configured for database index evaluation using quantile classification in accordance with an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a database index evaluation platform 105 and a database system 106.

The user devices 102 may comprise, for example, devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The database index evaluation platform 105 may comprise a database performance evaluation module 110 and an index recommendation prioritization module 114. The database performance evaluation module 110, in some embodiments, may evaluate historical query performance data for a given query, such as an average number of query executions, a frequency of occurrence of the given query as a resource intensive query and an estimated query execution time savings for the given query, as discussed further below in conjunction with FIG. 3. The historical query performance data may be evaluated over a designated time interval, such as the past 30 days. In one or more embodiments, the index recommendation prioritization module 114 applies quantile classification techniques to the historical query performance data to prioritize database indexes (e.g., recommended database indexes), as discussed further below in conjunction with FIGS. 2 and 3.

Exemplary processes utilizing elements 110 and/or 114 will be described in more detail with reference to, for example, FIGS. 3, 4, 7 and 9.

It is to be appreciated that this particular arrangement of elements 110 and/or 114 illustrated in the database index evaluation platform 105 of the FIG. 1 embodiment is presented by way of example only, and alternative arrangements can be used in other embodiments. For example, the functionality associated with the elements 110 and/or 114 in other embodiments can be combined into a single module, or separated across a larger number of modules. As another example, multiple distinct processors can be used to implement different ones of the elements 110 and/or 114 or portions thereof.

At least portions of elements 110 and/or 114 may be implemented at least in part in the form of software that is stored in memory and executed by a processor.

Additionally, the database system 106 may comprise one or more databases 107, one or more database indexes 108 and database performance data 109. The one or more databases 107 may be configured to store data, in a known manner. An example database 107, such as depicted in the present embodiment, can be implemented using one or more storage systems associated with the database index evaluation platform 105. Such storage systems can comprise any of a variety of different types of storage including network-attached storage (NAS), storage area networks (SANs), direct-attached storage (DAS) and distributed DAS, as well as combinations of these and other storage types, including software-defined storage.

The one or more database indexes 108 may improve the performance of data retrieval operations, such as queries, for example, by reducing the number of data records to be processed. In some embodiments, the database performance data 109 may comprise historical query performance data for queries applied against a given database, such as an average number of executions of each query, a frequency of occurrence of each query as a resource intensive query (or another resource category, such as queries that take the longest time to run or are executed most frequently) and an estimated query execution time savings for each query.

Also associated with the database index evaluation platform 105 are one or more input-output devices, which illustratively comprise keyboards, displays or other types of input-output devices in any combination. Such input-output devices can be used, for example, to support one or more user interfaces to the database index evaluation platform 105, as well as to support communication between database index evaluation platform 105 and other related systems and devices not explicitly shown.

Additionally, the database index evaluation platform 105 in the FIG. 1 embodiment is assumed to be implemented using at least one processing device. Each such processing device generally comprises at least one processor and an associated memory, and implements one or more functional modules for controlling certain features of the database index evaluation platform 105.

More particularly, the database index evaluation platform 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the database index evaluation platform 105 to communicate over the network 104 with the user devices 102, and illustratively comprises one or more conventional transceivers.

It is to be understood that the particular set of elements shown in FIG. 1 for the database index evaluation platform 105 involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the database index evaluation platform 105 and databases 107 can be on and/or part of the same processing platform.

Figure 2:
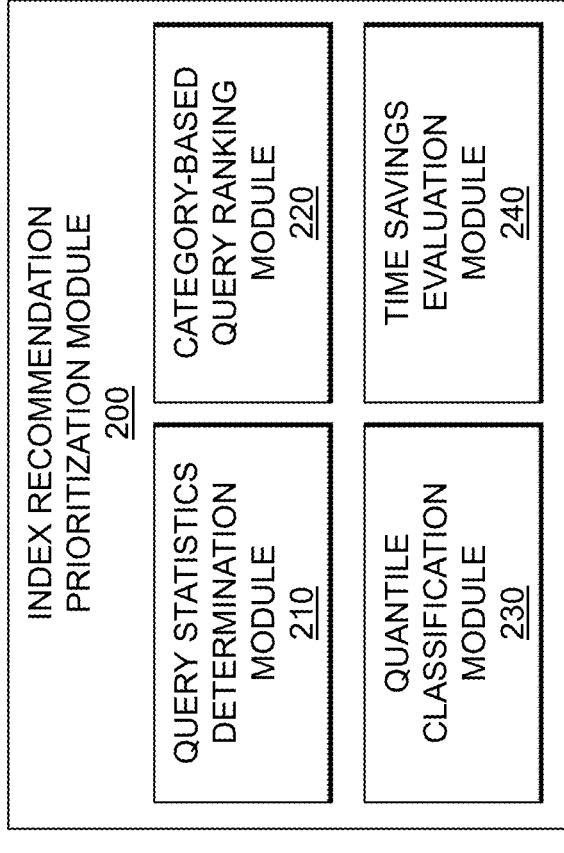
FIG. 2 illustrates the index recommendation prioritization module of FIG. 1 in further detail in accordance with an illustrative embodiment.

FIG. 2 illustrates the index recommendation prioritization module of FIG. 1 in further detail in accordance with an illustrative embodiment. In the example of FIG. 2, the index recommendation prioritization module 200 comprises a query statistics determination module 210, a category-based query ranking module 220, a quantile classification module 230 and a time savings evaluation module 240.

In one or more embodiments, the query statistics determination module 210 may obtain and evaluate historical query performance data for a given query, such as an average number of query executions, a frequency of occurrence of the given query as a resource intensive query and an estimated query execution time savings for the given query. The historical query performance data may be evaluated over a designated time interval, such as the past 30 days.

The category-based query ranking module 220 may apply quantile classification techniques to the historical query performance data for one or more queries associated with a given database to prioritize database indexes (e.g., recommended database indexes). The category-based query ranking module 220 may assign priority labels to the database indexes associated with such one or more queries based on the results of the quantile classification. In this manner, database administrators, developers and other IT professionals may focus on the most valuable database index recommendations and prioritize their efforts accordingly.

In some embodiments, the quantile classification module 230 implements a quantile classification, for example, on behalf of the category-based query ranking module 220, against the historical query performance data. The quantile classification function may be expressed as follows:

$$\text{Index Priority=quantile (log (average\_query\_}$$
$$\text{execution*top\_query\_occurrence*estimated\_time\_}$$
$$\text{saving)).[(0.33, 0.66)],}$$

where the top_query_occurrence indicates, for example, the number of days within the designated time interval (e.g., 30 days) that the given query was a top query (e.g., where the given query satisfied one or more criteria specified for resource intensive queries, such as a number of query executions, an IO wait time, a resource usage, an elapsed query execution time and/or a processor execution time), the estimated_time_saving indicates, for example, how much time is saved when the database index is implemented for the given query, and quantile values below the $33^{rd}$ percentile are assigned a low priority, quantile values between the $33^{rd}$ and $66^{th}$ percentiles are assigned a medium priority and quantile values above the $66^{th}$ percentile are assigned a high priority.

Thus, in at least some embodiments, the quantile classification function initially calculates the product of three variables, such as average_query_execution, top_query_occurrence and estimated_time_saving for a given query, then takes the natural logarithm (log) of the obtained product and calculates the quantiles at the $33^{rd}$ and $66^{th}$ percentiles, for example, of the log-transformed values. Finally, the quantile classification function assigns a priority to each database index using the resulting quantiles.

The time savings evaluation module 240 may evaluate the performance of each query associated with a given recommended index before and after the given recommended index is implemented.

Figure 3:
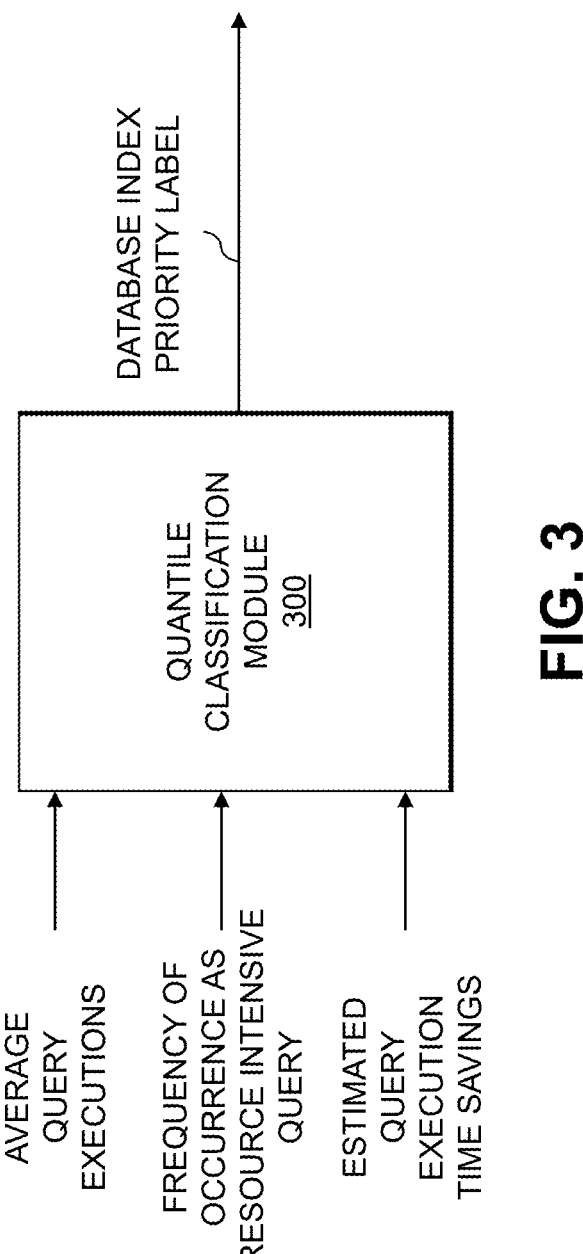
FIG. 3 illustrates the quantile classification module of FIG. 2 in further detail in accordance with an illustrative embodiment.

FIG. 3 illustrates the quantile classification module of FIG. 2 in further detail in accordance with an illustrative embodiment. In the example of FIG. 3, for each query, associated with a given database, and having a recommended database index, (i) an average number of query executions (e.g., per day) for a given query, (ii) a frequency of occurrence of the given query as a resource intensive query (such as a number of query executions, an IO wait time, a resource usage, an elapsed query execution time and/or a processor execution time) and/or (iii) an estimated query execution time savings for the given query are applied to the quantile classification module 300 (e.g., a processor-based quantile classifier implemented using at least one processing device). The quantile classification module 300 processes the applied inputs and determines a database index priority label for each recommended database index associated with queries applied against the given database.

In some embodiments, an average number of query executions may be based on a number of times that a given query is executed each day in the past 30 days. A resource intensive query may comprise queries that exceed a utilization threshold with respect to compute and/or memory resources (for example, a utilization threshold may be specify that queries utilizing more than 80% of the available compute and/or memory resources are resource intensive queries). The estimated query execution time savings may estimate an amount of time that can be saved after a given recommended database index is created for a given query.

FIG. 4 is a flow diagram illustrating an exemplary implementation of a process for assigning priority labels to recommended database indexes in accordance with an illustrative embodiment. In the example of FIG. 4, historical performance data is collected in step 402 for a given database. In step 404, the process of FIG. 4 analyzes and transforms the collected historical performance data for queries, having recommended database indexes, applied against the given database.

The average number of query executions, the frequency of occurrence as a resource intensive query (such as a number of query executions, an IO wait time, a resource usage, an elapsed execution time and/or a processor execution time) and the query execution time savings are extracted in step 406 for the queries, having recommended indexes, applied against the given database. A quantile classification is performed in step 408 for the given database (e.g., for the queries, having recommended indexes, applied against the given database). In step 410, a priority label is assigned to each recommended database index (e.g., top, medium or low priority labels).

FIG. 5 is a sample table illustrating exemplary information maintained for representative recommended database indexes in accordance with an illustrative environment. In the example of FIG. 5, in a database index recommendation table 500, each query is identified using a query identifier, and provides the parameters of the respective query, a recommended database index for the respective query and an estimated benefit of implementing the recommended database index for the respective query. The recommended database indexes for the respective queries may be provided, for example, by database vendors to improve the performance of a database system, as well as the corresponding estimated benefit of implementing the recommended database index for the respective query. The available number of such database index recommendations may depend on a number of factors, such as the size of a given database, a complexity of queries being executed, and overall performance requirements.

Generally, a database index provides an efficient way to quickly access the records from database files. For example, a database index may improve a processing speed for a database query by reducing the number of records to search speed (e.g., by providing an organized lookup table with pointers to the location of the requested data in a database). A database index may map search keys to corresponding locations of stored data by using different data structures.

FIG. 6 is a sample table illustrating exemplary priority information maintained for representative recommended database indexes in accordance with an illustrative environment. In the example of FIG. 6, a database index recommendation priority table 600 identifies the representative queries of FIG. 5 using a query identifier, and provides, for each query, the recommended database index, the estimated benefit of implementing the recommended database index, as well as the average number of query executions, the frequency of occurrence as a resource intensive query, the estimated query execution time savings and an assigned priority label.

The assigned priority label may be assigned, for example, by the quantile classification module 300 of FIG. 3. As noted above, the average number of query executions, the frequency of occurrence as a resource intensive query (such as a number of query executions, an IO wait time, a resource usage, an elapsed execution time and/or a processor execution time) and the estimated query execution time savings, for a given query, may be applied to the quantile classification module 300 to obtain the database index priority label for the given index recommendation.

FIG. 7 is a flow diagram illustrating an exemplary implementation of a process for evaluating query performance before and after a given database index is implemented in accordance with an illustrative embodiment. In the example of FIG. 7, the one or more database indexes are identified in step 702 based on, for example, assigned priority labels. In step 704, for a given database index, performance data is collected for queries associated with the given database index before the given database index is implemented.

The given database index is then implemented in step 706. In step 708, for a given database index, performance data is collected for queries associated with the given database index after the given database index is implemented.

The performance of each query associated with the given database index may be characterized in step 710 before and after the given database index is implemented (e.g., the execution time for these queries to complete before and after the database index creation). For example, after the implementation of the database indexes in step 706, for example, based on the assigned priorities, the performance of queries accessing the same database can be compared before and after the creation of the database index. In this manner, a comprehensive view of the impact of the new database indexes on query performance can be compared (revealing, for example, areas where performance has been improved and areas where performance has been degraded, providing a clear understanding of the impact of the database index creation on a given database). For example, a database index designed to improve performance for one query may impair performance of one or more other queries. If a given database index brings more harm than benefits to the overall database performance, database administrators or other IT personnel can choose to roll back the database index creation and revert to the previous state.

A test is performed in step 712 to determine if there are additional database indexes to process. If it is determined in step 712 that there are additional database indexes to process, then program control returns to step 704. If, however, it is determined in step 712 that there are no additional database indexes to process, then program control ends.

FIG. 8 is a sample table illustrating exemplary query performance information maintained for representative queries in accordance with an illustrative environment. In the example of FIG. 8, an index query performance table 800 provides, for each identified query, the corresponding recommended database index, the database index creation date, the pre-index execution time (e.g., as determined by the process of FIG. 7), the post-index execution time (e.g., as determined by the process of FIG. 7), and a performance analysis (e.g., that the performance of the respective query improves, degrades or remains the same).

FIG. 9 is a flow diagram illustrating an exemplary implementation of a process 900 for database index evaluation using quantile classification in accordance with an illustrative embodiment. In the example of FIG. 9, information characterizing one or more database indexes is obtained in step 902 for one or more database indexes associated with a given database (e.g., database indexes that have not yet been implemented).

One or more data structures comprising performance data for one or more queries applied against the given database are accessed in step 904, wherein the performance data for a given query comprises two or more of: (i) a number of executions of the given query, (ii) a number of occurrences of the given query satisfying one or more resource utilization criteria and (iii) an estimated execution time savings for the given query using at least one of the one or more database indexes. The term "data structure," as used herein, is intended to be broadly construed, so as to encompass, for example, a wide variety of different types of tables, arrays, graphs, trees, linked lists, and additional or alternative data relation mechanisms, as well as portions or combinations thereof. Accordingly, a given data structure can comprise a combination of multiple smaller data structures, possibly of different types, or a portion of a larger data structure. Numerous other arrangements are possible, as would be apparent to a person of ordinary skill in the art based on the present disclosure.

At least a portion of the performance data is applied in step 906 to a processor-based quantile classifier that assigns a priority to at least one of the one or more database indexes. One or more automated actions are initiated in step 908 based at least in part on the assigned priority of the at least one database index.

In at least one embodiment, the processor-based quantile classifier separates the one or more database indexes into a designated number of data sets, wherein each of the data sets corresponds to a different priority label. The processor-based quantile classifier may apply a natural logarithm function to an aggregation of the at least the portion of the performance data. The performance data may be obtained for a designated time interval.

In some embodiments, the process 900 of FIG. 9 may also (a) determine a query execution time of one or more queries associated with a given database index (i) before the given database index is implemented and (ii) after the given database index is implemented; (b) obtain performance data for the one or more queries associated with the given database index (i) before the given database index is implemented and (ii) after the given database index is implemented; and/or (c) determine whether the given database index reduces the query execution time of the one or more queries associated with the given database index.

In one or more embodiments, the at least one automated action comprises one or more of: generating one or more notifications related to the assigned priority of the at least one database index; generating one or more signals related to the assigned priority of the at least one database index; and controlling a performance of at least one action in another system using the assigned priority of the at least one database index.

The particular processing operations and other network functionality described in conjunction with FIGS. 3, 4, 7 and 9, for example, are presented by way of illustrative example only, and should not be construed as limiting the scope of the disclosure in any way. Alternative embodiments can use other types of processing operations for database index evaluation using quantile classification. For example, the ordering of the process steps may be varied in other embodiments, or certain steps may be performed concurrently with one another rather than serially. In one aspect, the process can skip one or more of the steps. In other aspects, one or more of the steps are performed simultaneously. In some aspects, additional steps can be performed.

One or more embodiments of the disclosure provide improved methods, apparatus and computer program products for database index evaluation using quantile classification. The foregoing applications and associated embodiments should be considered as illustrative only, and numerous other embodiments can be configured using the techniques disclosed herein, in a wide variety of different applications.

It should also be understood that the disclosed techniques for database index evaluation using quantile classification, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for database index evaluation using quantile classification may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute and/or storage services can be offered to cloud infrastructure tenants or other system users as a PaaS, IaaS, STaaS and/or FaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based database index evaluation engine, or portions thereof, are illustratively implemented for use by tenants of such a multi-tenant environment.

Cloud infrastructure as disclosed herein can include cloud-based systems. Virtual machines provided in such systems can be used to implement at least portions of a cloud-based database index evaluation platform in illustrative embodiments. The cloud-based systems can include object stores.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. These platforms may also be used to implement at least portions of other information processing systems in other embodiments.

Figure 10:
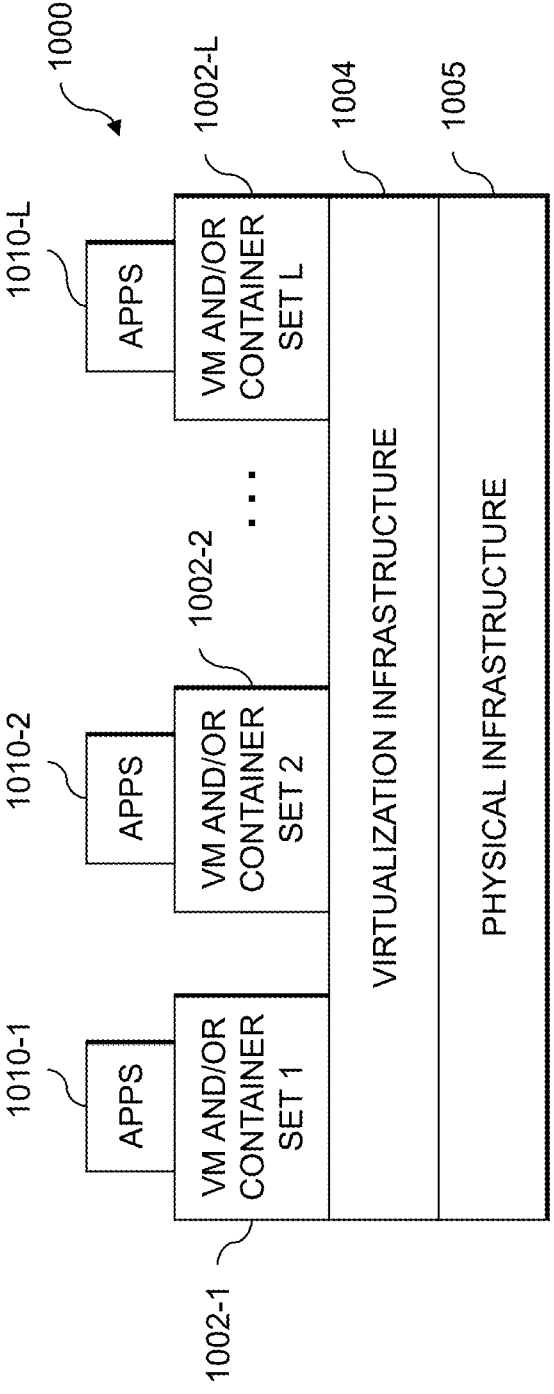
FIG. 10 illustrates an exemplary processing platform that may be used to implement at least a portion of one or more embodiments of the disclosure comprising a cloud infrastructure.

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. Such implementations can provide chat assistant adaptation functionality of the type described above for one or more processes running on a given one of the VMs. For example, each of the VMs can implement database index evaluation control logic and associated functionality for prioritizing database indexes.

An example of a hypervisor platform that may be used to implement a hypervisor within the virtualization infrastructure 1004 is a compute virtualization platform which may have an associated virtual infrastructure management system such as server management software. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system. Such implementations can provide chat assistant adaptation functionality of the type described above for one or more processes running on different ones of the containers. For example, a container host device supporting multiple containers of one or more container sets can implement one or more instances of database index evaluation control logic and associated functionality for prioritizing database indexes.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises at least a portion of the given system and includes a plurality of processing devices, denoted 1102-1, 1102-2, 1102-3, . . . 1102-K, which communicate with one another over a network 1104. The network 1104 may comprise any type of network, such as a WAN, a LAN, a satellite network, a telephone or cable network, a cellular network, a wireless network such as WiFi or WiMAX, or various portions or combinations of these and other types of networks.

The processing device 1102-1 in the processing platform 1100 comprises a processor 1110 coupled to a memory 1112. The processor 1110 may comprise a microprocessor, a microcontroller, an ASIC, an FPGA or other type of processing circuitry, as well as portions or combinations of such circuitry elements, and the memory 1112, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and the given system may include additional or alternative processing platforms, as well as numerous distinct processing platforms in any combination, with each such platform comprising one or more computers, storage devices or other processing devices.

Figure 11:
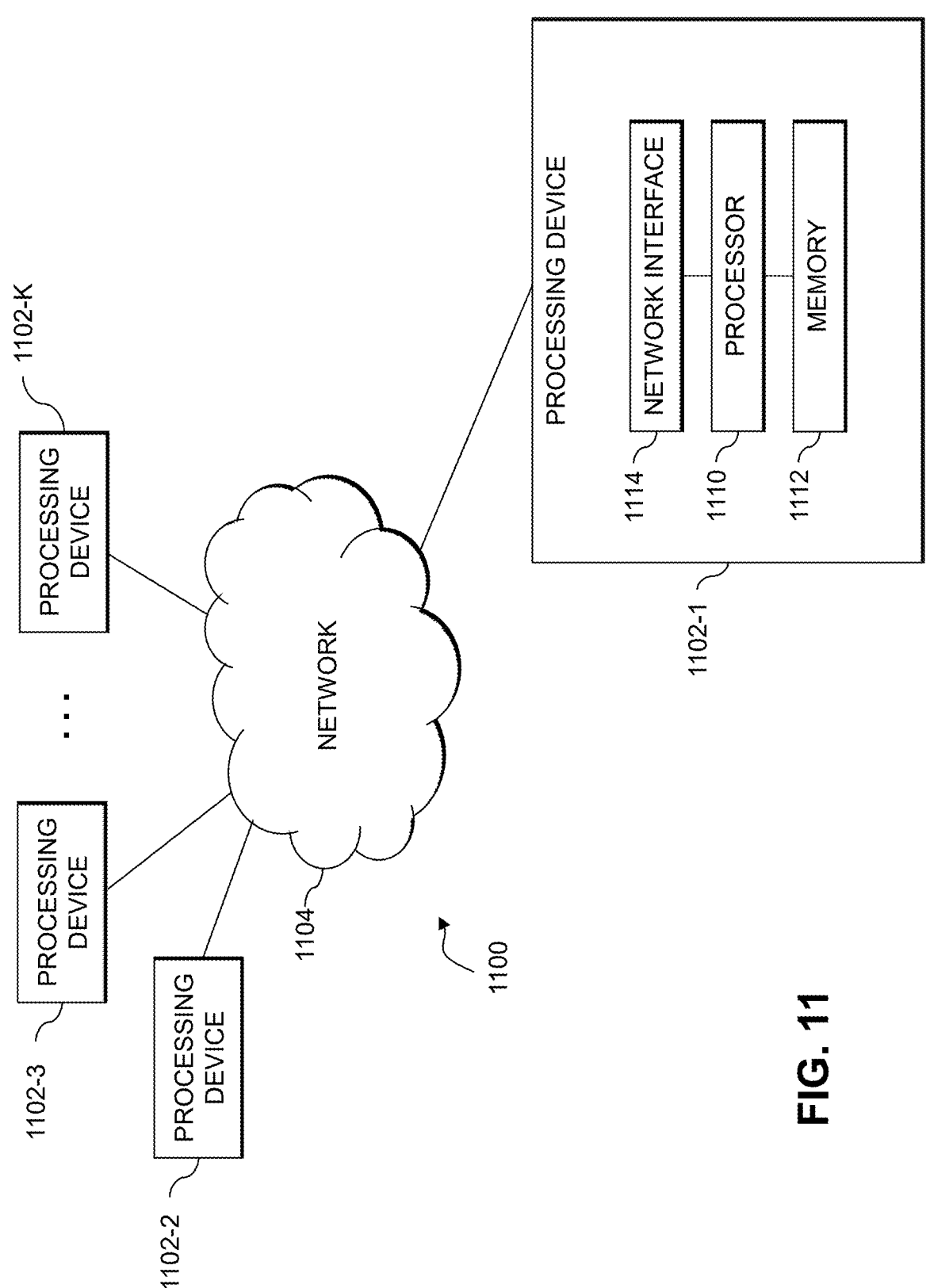
FIG. 11 illustrates another exemplary processing platform that may be used to implement at least a portion of one or more embodiments of the disclosure.

Multiple elements of an information processing system may be collectively implemented on a common processing platform of the type shown in FIG. 10 or 11, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method, comprising:

obtaining information characterizing one or more database indexes associated with a given database;

accessing one or more data structures comprising performance data for one or more queries applied against the given database, wherein the performance data for a given query comprises two or more of: (i) a number of executions of the given query, (ii) a number of occurrences of the given query that satisfy one or more resource utilization criteria and (iii) an estimated execution time savings for the given query using at least one of the one or more database indexes, wherein the estimated execution time savings for the given query with respect to a particular database index is based at least in part on a difference between (a) an execution time of the given query before the particular database index is implemented and (b) an execution time of the given query after the particular database index is implemented;

applying at least a portion of the performance data to a processor-based quantile classifier that assigns a priority to at least one of the one or more database indexes, wherein the processor-based quantile classifier separates the one or more database indexes into a designated number of data sets, wherein each of the data sets corresponds to a different priority label; and initiating one or more automated actions based at least in part on the assigned priority of the at least one database index;

wherein the method is performed by at least one processing device comprising a processor coupled to a memory.

2. The computer-implemented method of claim 1, wherein the processor-based quantile classifier applies a natural logarithm function to an aggregation of the at least the portion of the performance data for the given query.

3. The computer-implemented method of claim 1, wherein the performance data is obtained for a designated time interval.

4. The computer-implemented method of claim 1, further comprising determining a query execution time of one or more queries associated with a given database index (i) before the given database index is implemented and (ii) after the given database index is implemented.

5. The computer-implemented method of claim 4, further comprising obtaining performance data for the one or more queries associated with the given database index (a) before the given database index is implemented and (b) after the given database index is implemented.

6. The computer-implemented method of claim 4, further comprising determining whether the given database index reduces the query execution time of the one or more queries associated with the given database index.

7. The computer-implemented method of claim 1, wherein at least one of the one or more automated actions comprises one or more of: generating one or more notifications related to the assigned priority of the at least one database index; generating one or more signals related to the assigned priority of the at least one database index; and controlling a performance of at least one action in another system using the assigned priority of the at least one database index.

8. An apparatus comprising:

at least one processing device comprising a processor coupled to a memory;

the at least one processing device being configured to implement the following steps:

obtaining information characterizing one or more database indexes associated with a given database;

accessing one or more data structures comprising performance data for one or more queries applied against the given database, wherein the performance data for a given query comprises two or more of: (i) a number of executions of the given query, (ii) a number of occurrences of the given query that satisfy one or more resource utilization criteria and (iii) an estimated execution time savings for the given query using at least one of the one or more database indexes, wherein the estimated execution time savings for the given query with respect to a particular database index is based at least in part on a difference between (a) an execution time of the given query before the particular database index is implemented and (b) an execution time of the given query after the particular database index is implemented;

applying at least a portion of the performance data to a processor-based quantile classifier that assigns a priority to at least one of the one or more database indexes, wherein the processor-based quantile classifier separates the one or more database indexes into a designated number of data sets, wherein each of the data sets corresponds to a different priority label; and initiating one or more automated actions based at least in part on the assigned priority of the at least one database index.

9. The apparatus of claim 8, wherein the processor-based quantile classifier applies a natural logarithm function to an aggregation of the at least the portion of the performance data for the given query.

10. The apparatus of claim 8, wherein the performance data is obtained for a designated time interval.

11. The apparatus of claim 8, further comprising determining a query execution time of one or more queries associated with a given database index (i) before the given database index is implemented and (ii) after the given database index is implemented.

12. The apparatus of claim 8, wherein at least one of the one or more automated actions comprises one or more of: generating one or more notifications related to the assigned priority of the at least one database index; generating one or more signals related to the assigned priority of the at least one database index; and controlling a performance of at least one action in another system using the assigned priority of the at least one database index.

13. A non-transitory processor-readable storage medium having stored therein program code of one or more software programs, wherein the program code when executed by at least one processing device causes the at least one processing device to perform the following steps:

obtaining information characterizing one or more database indexes associated with a given database;

accessing one or more data structures comprising performance data for one or more queries applied against the given database, wherein the performance data for a given query comprises two or more of: (i) a number of executions of the given query, (ii) a number of occurrences of the given query that satisfy one or more resource utilization criteria and (iii) an estimated execution time savings for the given query using at least one of the one or more database indexes, wherein the estimated execution time savings for the given query with respect to a particular database index is based at least in part on a difference between (a) an execution time of the given query before the particular database index is implemented and (b) an execution time of the given query after the particular database index is implemented;

applying at least a portion of the performance data to a processor-based quantile classifier that assigns a priority to at least one of the one or more database indexes, wherein the processor-based quantile classifier separates the one or more database indexes into a designated number of data sets, wherein each of the data sets corresponds to a different priority label; and initiating one or more automated actions based at least in part on the assigned priority of the at least one database index.

14. The non-transitory processor-readable storage medium of claim 13, wherein the processor-based quantile classifier applies a natural logarithm function to an aggregation of the at least the portion of the performance data for the given query.

15. The non-transitory processor-readable storage medium of claim 13, wherein the performance data is obtained for a designated time interval.

16. The non-transitory processor-readable storage medium of claim 13, further comprising determining a query execution time of one or more queries associated with a given database index (i) before the given database index is implemented and (ii) after the given database index is implemented and determining whether the given database index reduces the query execution time of the one or more queries associated with the given database index.

17. The non-transitory processor-readable storage medium of claim 13, wherein at least one of the one or more automated actions comprises one or more of: generating one or more notifications related to the assigned priority of the at least one database index; generating one or more signals related to the assigned priority of the at least one database index; and controlling a performance of at least one action in another system using the assigned priority of the at least one database index.

18. The apparatus of claim 11, further comprising obtaining performance data for the one or more queries associated with the given database index (a) before the given database index is implemented and (b) after the given database index is implemented.

19. The apparatus of claim 11, further comprising determining whether the given database index reduces the query execution time of the one or more queries associated with the given database index.

20. The non-transitory processor-readable storage medium of claim 16, further comprising obtaining performance data for the one or more queries associated with the given database index (a) before the given database index is implemented and (b) after the given database index is implemented.

* * * * *